US011195235B2

(12) United States Patent
Acosta et al.

(10) Patent No.: US 11,195,235 B2
(45) Date of Patent: Dec. 7, 2021

(54) LOCATION-BASED TRACKING SYSTEM (71) Applicant: HRB Innovations, Inc., Las Vegas, NV (US)

(72) Inventors: Jennifer Acosta, Shawnee, KS (US); Daniel D. Martin, Kansas City, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 419 days.

(21) Appl. No.: 15/464,543

(22) Filed: Mar. 21, 2017

(65) Prior Publication Data
US 2018/0276764 A1 Sep. 27, 2018

(51) Int. Cl.
*G06Q 40/00* (2012.01)
(52) U.S. Cl.
CPC .................. *G06Q 40/123* (2013.12)
(58) Field of Classification Search
CPC ..... G06Q 40/123; G06Q 20/325; G06Q 40/00
See application file for complete search history.

(56) References Cited

U.S. PATENT DOCUMENTS

| | | | | |
|---|---|---|---|---|
| 7,610,226 B1* | 10/2009 | Miller | ................... | G06Q 20/207 705/19 |
| 8,200,553 B1* | 6/2012 | Hermreck | .............. | G06Q 40/02 705/30 |
| 8,543,509 B1* | 9/2013 | Gundy | ................... | G06Q 40/00 705/44 |
| 8,554,647 B1* | 10/2013 | Grigg | ................. | G06Q 30/0639 701/469 |
| 8,965,410 B2* | 2/2015 | Clark | ...................... | H04W 4/02 455/456.3 |
| 9,702,713 B2* | 7/2017 | Jung | ....................... | G06F 16/29 |
| 2004/0039649 A1* | 2/2004 | Mull | ..................... | G06Q 20/04 705/39 |
| 2004/0044622 A1* | 3/2004 | Blott | .................... | G06Q 20/102 705/40 |
| 2007/0156581 A1* | 7/2007 | Imrey | ................... | G06Q 20/02 705/39 |
| 2008/0005017 A1* | 1/2008 | Poster | .................... | G06Q 20/10 705/39 |

(Continued)

OTHER PUBLICATIONS

"How to Change Your Amazon Smile Charity, Apr. 3, 2016, Amazon," (Year: 2016).*

(Continued)

*Primary Examiner* — Shahid Merchant
*Assistant Examiner* — Gregory M James
(74) *Attorney, Agent, or Firm* — Erise IP, P.A.

(57) ABSTRACT

Described is identifying entities based at least in part on the location of a user device. A server or the user device will determine the location of the user device and/or whether there are any beacons, such as proximity beacons, in the vicinity. The server or the user device will then determine where the user is and if there are any identifiable entities within a certain distance to that location. In performing these steps, the server and/or the user device may access a database for the geographical area. The user device will then receive information related to a function as indicated by the user, such as the facilitation of a donation, a non-obligated payment, or an obligated payment to the entity.

19 Claims, 4 Drawing Sheets

(56) References Cited

U.S. PATENT DOCUMENTS

| | | | |
|---|---|---|---|
| 2015/0059002 A1* | 2/2015 | Balram | G06F 3/011 726/28 |
| 2015/0079942 A1* | 3/2015 | Kostka | H04W 4/21 455/411 |
| 2015/0142688 A1* | 5/2015 | Jackson | G06Q 30/0279 705/329 |
| 2016/0019522 A1* | 1/2016 | Granbery | G06Q 20/227 705/21 |
| 2016/0058336 A1* | 3/2016 | Blahnik | A61B 5/1116 600/595 |
| 2017/0026782 A1* | 1/2017 | Gold | H04L 67/12 |
| 2017/0178117 A1* | 6/2017 | McClard | G06Q 20/223 |

OTHER PUBLICATIONS

"John Gin, Plan ahead for charitable giving, Mar. 16, 2014, Times—Picayune" (Year: 2014).*

* cited by examiner

LOCATION-BASED TRACKING SYSTEM

BACKGROUND

1. Field

Embodiments of the invention relate to location-based tracking and the identification of nearby entities.

2. Related Art

It is common for systems of the prior art to allow for a user to know their current location and be presented with a map of nearby locations, such as landmarks, roads, topography, and buildings. However, typically these prior art systems are onerous on the user to determine specific entities (such as businesses, charitable organizations, and people) in vicinity thereto. The user is typically required to search for the desired entity or otherwise manually inspect the displayed map. The displayed map will often only include minimal information for any nearby entities.

SUMMARY

Embodiments of the invention solve the above-mentioned problems by providing a system to identify entities based at least in part on the location of a user device. A server or the user device will then determine the location of the user device and/or whether there are any beacons, such as proximity beacons, in the vicinity (e.g., within communicable range of the user device). For example, if the user is at a certain event or location, the user may select a button on the graphical user interface. The server or the user device will then determine where the user is and if there are any identifiable entities within a certain distance, which may be pre-set, to that location. In performing these steps, the server and/or the user device may access a database for the geographical area. The user device will then receive information related to a function as indicated by the user, such as the facilitation of a donation or payment to the entity.

A first embodiment of the invention is generally directed to a system configured to assist a user with making a charitable donation, the system comprising a beacon and a server. The beacon is configured to provide a beacon identifier to a user device. The server is configured to be communicatively coupled to the user device. The server is configured to identify at least one charitable organization based at least in part on the beacon identifier, and to facilitate a donation payment to the charitable organization from the user.

A second embodiment of the invention is generally directed to a computerized method comprising: acquiring, from a location-determining element, a location indication of a user device; determining at least one entity associated with the location indication of the user device; receiving, from a user, a donation indication indicative of a non-obligated payment to be transferred to the entity; and generating a non-obligated payment to the entity.

A third embodiment of the invention is generally directed to a non-transitory computer readable medium having a computer program thereon for facilitating and tracking a charitable donation, wherein the computer program is configured to instruct at least one processor to perform the following steps: determining a location of a user device; determining at least one entity associated with the determined location of the user device; receiving, from a user, a donation indication indicative of a non-obligated payment to be transferred to the entity; and generating a non-obligated payment to the entity.

A fourth embodiment of the invention is generally directed to a computerized method for facilitating a donation payment, the method comprising the following steps: acquiring a start indication that is indicative of a location of a user device; determining at least one charitable organization associated with the indicated location of the user device; receiving, from a user, a donation indication indicative of a donation payment to be transferred to the charitable organization; generating a donation payment to the charitable organization; and storing a donation payment indication for a future tax return preparation.

A fifth embodiment of the invention is generally directed to a system for facilitating a donation payment, the system comprising a location-determining element and a processor. The location-determining element is configured to acquire an indication of a location of a user device. The processor configured to perform the following steps: acquiring a start indication that is indicative of a location of a user device; determining at least one charitable organization associated with the indicated location of the user device; receiving, from a user, a donation indication indicative of a donation payment to be transferred to the charitable organization; generating a donation payment to the charitable organization; and storing a donation payment indication for a future tax return preparation.

Other embodiments of the invention are also directed to a non-transitory computer readable medium having a computer program stored thereon, wherein the computer program instructs at least one processing element to perform the various steps discussed herein. Still other embodiments of the invention are generally directed to a donation engine that is configured to perform the various steps discussed herein.

BRIEF DESCRIPTION OF THE DRAWING FIGURES

Embodiments of the invention are described in detail below with reference to the attached drawing figures, wherein.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

Figure 1:
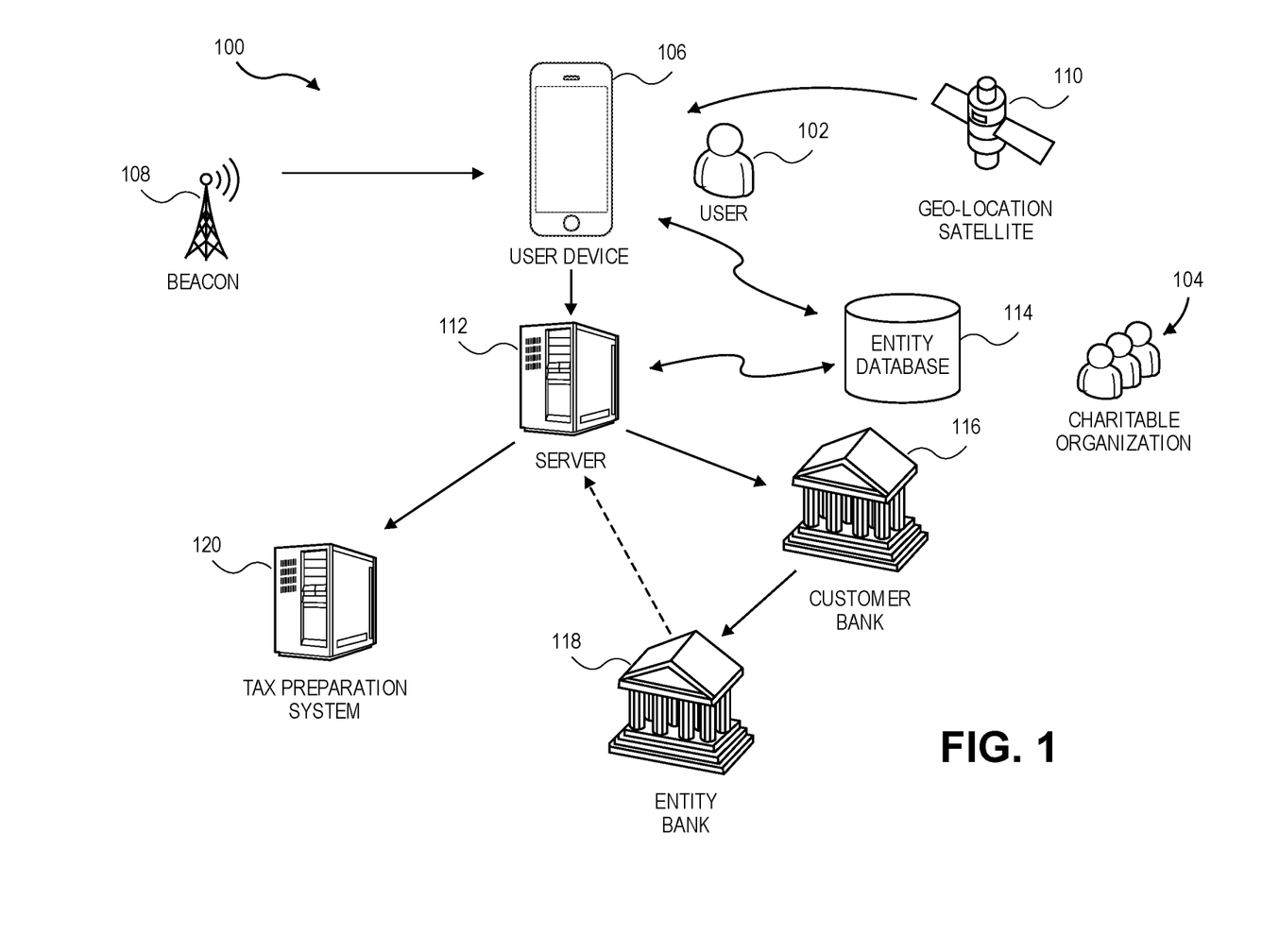
FIG. 1 is a system diagram illustrating various components of a system for facilitating and tracking the user location.

Embodiments of the invention comprise a computer program, a computerized method, and a system 100 for location-based tracking and identification of nearby entities. In some embodiments, the system may facilitate a payment from a user 102 to an entity 104. The payment is prompted based upon a location of a user device 106. The location of a user device 106 is determined either via a beacon 108 or a geo-location satellite 110. The location may be associated with an entity 104. The user device 106 may communicate with a server 112 that will identify the entity 104 from an entity database 114, and facilitate the donation between a user financial institution, such as financial institution 116, and an entity financial institution, such as financial institution 118. The server 112 may also send information to a tax preparation system 120.

Turning to the figures, an exemplary embodiment of the invention is illustrated in FIG. 1. Broadly, FIG. 1 shows a system 100 of embodiments of the invention and how the system 100 interacts with external systems and components. In some embodiments of the invention, the system 100 comprises a user device 106 and a server 112. In other embodiments, the system 100 comprises at least one beacon 108, the user device 106, and the server 112. In still other embodiments, the system 100 comprises the server 112 and a tax preparation system 120. In embodiments of the invention, the various components of the system 100 may interact with a user financial institution 116, an entity financial institution 118, and/or a tax preparation system 120. As can be appreciated, other embodiments of the invention may comprise other combinations of the discussed components.

FIG. 1 depicts the user device 106 that is associated with a user. The user device 106 determines, or receives information indicative of, a donation opportunity. The donation opportunity may be associated with a charitable organization, a charitable event, or other non-obligatory payment opportunity. FIG. 1 depicts that in some embodiments, the donation opportunity is determined based at least in part on a beacon 108, a geo-location satellite 110 (such as associated with a global positioning system), and/or another location indicator (such as a Wi-Fi router, a mobile broadband tower, or the like) that may provide information indicative of a location to a location element of the user device 106. Based upon the location information, either or both of the user device 106 and the server 112 may access an entity database 114 to determine if the user device 106 is within a certain vicinity of a known entity location (which may either be a permanent location or a temporary location, such as at a charitable event). The known entity location may be set up by the entity location (such as through a sign-up process completed by the entity 104) or be automatic based upon map information (such as the entity 104 appearing in static map data for the vicinity). The known entity location may therefore be determined by either an opt-in system (in which the entity 104 indicates that the entity 104 wishes to participate in the system 100), a set of publicly available or proprietary information, or a combination thereof.

In some embodiments of the invention, the location is determined at least in part by the beacon 108. The beacon 108 is a proximity beacon that operates to broadcast information to nearby devices. In some embodiments, the beacon 108 operates utilizing Bluetooth technology. Bluetooth is a wireless technology standard for exchanging data over relatively short distances. The beacon 108 may additionally or alternatively utilize radio-frequency identification (RFID) technology. RFID utilizes electromagnetic fields to identify and track proximity tags that are associated with various objects (such as the beacon 108 or the user device 106). The beacon 108 may additionally or alternatively utilize Wi-Fi technology.

In embodiments of the invention, the beacon 108 generates a set of credentials for the beacon 108 and/or the entity 104. The set of credentials includes information about the beacon 108 and/or the method in which the beacon 108 may be identified. For example, the set of credentials may include a beacon identifier for the beacon 108, a hardware address (such as a "MAC address") of the beacon 108, an assigned identification number and/or name of the beacon 108, an identification number and/or or name of the professional associated with the beacon 108, or other identifying information.

In some embodiments, the set of credentials is relatively simple. For example, the set of credentials may only provide the fourth octet of the IP address of the beacon 108. The user device 106 may then take the first three octets of its own IP address and replace the fourth octet with the set of credentials from the beacon 108 to arrive at the IP address of the beacon 108. In this way, the set of credentials is both simple (in that it relays a small amount of information) and secure (in that the set of credentials is meaningless unless the device has the same initial three octets by being connected to the same server 112).

In other embodiments, the set of credentials is relatively complex. For example, the set of credentials may include information indicative of the IP address of the beacon 108, the MAC address of the beacon 108, and the name or identification number of the entity 104. The set of credentials may also include information indicative of the user device 106 or devices that are expected to be in proximity of the beacon 108. The beacon 108 may know (such as from a schedule or via receipt of an electronic message) the name or account number of the next expected client. The set of credentials may therefore include this information, such that the beacon 108 only interacts with certain user devices.

It should be appreciated that embodiments of the invention as discussed herein may be directed to utilizing the invention to provide a donation to a charitable organization, but this is merely an exemplary embodiment for the invention. Other exemplary fields of use could be to facilitate another non-obligated payment. Non-obligated payments may include tips, over-payments, gifts, covenants, expressions of gratitude, campaign contributions, and other situations in which the user wishes to provide a payment to an entity independent of a contractual or other legal obligation to provide the payment. These non-obligated payments may be made to for-profit companies, non-profit organizations, government entities, individuals, or some combination thereof.

Charitable organizations and charitable donations are used throughout much of the description as an exemplary non-obligated payment and non-obligated payee. As used herein, a "charitable organization" may include any type of non-profit organization. Many charitable organizations include or are directed toward a philanthropic goal, though that is not required. Examples of philanthropic goals include relief of the poor, the distressed, or the underprivileged; advancement of religion; advancement of education or science; construction or maintenance of public buildings, monuments, or works; lessening the burdens of government; lessening of neighborhood tensions; elimination of prejudice and discrimination; defense of human and civil rights secured by law; and combating community deterioration and juvenile delinquency. In some instances the charitable organization and any donation thereto are entitled to a tax reduction or a tax rebate. Charitable organizations often depend on philanthropic giving from outside organizations to achieve the philanthropic goal. These outside organizations may include government entities, corporations, other non-profit organizations, and individuals.

A number of other organizations, including those organized for religious, scientific, literary and educational purposes, as well as those for testing for public safety and for fostering national or international amateur sports competition, and for the prevention of cruelty to children or animals, may also qualify for exempt status. These other organizations, and other types of charitable organizations, may be described herein as "charitable organizations." It should also be appreciated that the entity 104, for purposes of this invention, need not be a recognized charitable organization by the IRS or any other entity. The entity 104 may be a new organization, an impromptu call for support, an extension or association with an existing entity 104, or the like.

In the United States, a charitable organization is an organization operated for purposes that are beneficial to the public interest. There are different types of charitable organizations. Every U.S. and foreign charity that qualifies as tax-exempt under Section 501(c)(3) of the Internal Revenue Code is considered a "private foundation" unless it demonstrates to the Internal Revenue Service (IRS) that it falls into another category. Generally, any organization that is not a private foundation (i.e., it qualifies as something else) is usually a public charity as described in Section 509(a) of the Internal Revenue Code (IRC).

In addition, a private foundation usually derives its principal funding from an individual, family, corporation, or some other single source and is more often than not a grantmaker and does not solicit funds from the public. In contrast, a foundation or public charity generally receives grants from individuals, government, and private foundations, and while some public charities engage in grantmaking activities, most conduct direct service or other tax-exempt activities. This leads to another distinction: Foundations that are generally grantmakers (i.e. they use their endowment to make grants to other organizations, which in turn carry out the goals of the foundation indirectly) are usually called "grantmaker" or "non-operating" foundations. These tend to be private foundations, but some private foundations (and most public charities) use their received funds to directly engage in service activities themselves and achieve their goals.

The requirements and procedures for forming charitable organizations vary from nation to nation, and state to state, as do the registration and filing requirements for charitable organizations that conduct charitable activities, solicit charitable contributions, or hire professional fundraisers. So, in practice the general definition of "charitable organization" may be determined, at least in part, by the requirements of federal and/or state law where the entity 104 operates, and the requirements for federal tax relief by the IRS. It should therefore be appreciated that, as used herein, "charitable organization" can fall within any of these categories.

Federal tax law provides tax benefits to nonprofit organizations recognized as exempt from federal income tax under section 501(c)(3) of the IRC. The benefits of 501(c)(3) status include exemption from federal income tax as well as eligibility to receive tax deductible charitable contributions. To qualify for 501(c)(3) status most organizations must apply to the IRS for such status.

In the United States, there are several requirements that must be met for a charitable organization to obtain 501(c)(3) status. These include the organization being organized as a corporation, trust, or unincorporated association, and the organization's organizing document (such as the articles of incorporation, trust documents, or articles of association) must limit its purposes to being charitable, and permanently dedicate its assets to charitable purposes. The organization must refrain from undertaking a number of other activities such as participating in the political campaigns of candidates for local, state or federal office, and must ensure that its earnings do not benefit any individual. Most tax exempt organizations are required to file annual financial reports (for example, IRS Form 990) at the state and federal level. A tax exempt organization's Form 990 and some other forms may to be made available to public scrutiny. Returning to FIG. 1, based upon the known entity location, the user device 106 (either independently or upon instruction by the server 112) presents to the user 102 an option to provide a payment. The user 102 may select to make the charitable donation and may set up various rules and criteria regarding the charitable donation, as discussed below. For example, the user 102 may select an amount for the donation, a recurrence for the donation, a proximity trigger for the donation, or other parameter. The various rules and criteria may be stored on the user device 106, on the server 112, or both. Based upon at least one rule or criteria, a future charitable donation (e.g., at a later time than the current charitable donation) may be initiated and sent, as discussed below.

In some embodiments, information indicative of the charitable donation is sent to the server 112. The server 112 determines if the charitable donation is possible based upon knowledge and access to a user financial institution 116 and an entity financial institution 118. The user financial institution 116 may include a customer account or otherwise have access to funds from the customer. For example, the user financial institution 116 may instead be customer credit card information, or another system that transfers customer funds (such as PAYPAL or GOOGLE WALLET). The entity financial institution 118 is configured to receive the funds on behalf of the entity 104. The entity financial institution 118 may include an entity account configured to receive the funds or otherwise be capable of receiving funds on behalf of the entity 104. As with the user financial institution 116, the entity financial institution 118 may be a traditional financial institution or other system that transfers funds.

In other embodiments of the invention, the user provides an indication of the desired payment without any further information being known to the system 100 about the entity 104 or other payee. The system 100 may determine additional information for the entity 104 based upon publicly available information. This could include accessing a website or other electronic resource associated with the entity 104 to determine how to provide payments to the entity 104. The system 100 may then use the electronic resource or information determined therefrom to provide the payment. In some embodiments, this may include a hierarchy of determining the best way to send the payment. In an exemplary hierarchy, the most certain would be registration information provided to the system 100 by a representative of the entity 104, the second most certain would be based upon information obtained from an electronic resource as discussed above, and a third most certain would be by determining a physical or mailing address associated with the charitable organization and providing a physical check by mail.

In other embodiments of the invention, the system 100 may further utilize at least one intermediate financial institution. The charitable donation may travel through the intermediate financial institution from the user financial institution 116 to the entity financial institution 118. In some embodiments, the intermediate financial institution may be associated with or controlled by the system 100, such that the donation amount is delivered via the intermediate financial institution to the entity financial institution 118. For example, the user 102 has an account with the intermediate financial institution associated with the system 100, and/or the entity 104 may have an account with the intermediate financial institution associated with the system 100. In other embodiments, the intermediate financial institution is associated with neither the user 102 nor the entity 104.

In embodiments of the invention, the entity financial institution 118 or the entity 104 sends a confirmation message to the server 112 indicating the donation funds were received. The confirmation may be indicative of the entity 104, the user 102, the amount of the donation, the purpose of the donation (if known), the date the donation was made, the user device 106 that initiated the donation, and any other information related to the charitable donation that may be used in tracking the charitable donation.

In embodiments of the invention, the system 100 interfaces with a tax preparation system 120. The tax preparation system 120 utilizes, imports, requests, or otherwise acquires information indicative of the donation. The tax preparation system 120 utilizes the information indicative of the donation to calculate the tax owed, as discussed below.

The user device 106 is communicatively coupled with the server 112, such as via a wireless (e.g., WiFi or Bluetooth) or broadband connection. The server 112 may be local to the system 100 that operates embodiments of the invention, local to the entity location, may be the user device 106 itself, or may be remote (such as in a cloud-based system). In other embodiments, the user device 106 may communicate directly with the beacon 108 or other network architecture. The information sent may include any of the following: information regarding the beacon 108, information regarding a location of the user device 106, information regarding the entity 104 associated with the beacon 108 or location, authentication of the client, authentication of the user device 106, information regarding a client account, information regarding donation services requested, and similar information. The beacon 108 may include information about the nearby entity or entities, or may provide geographical location information that is independent of nearby entities. The geographical information provided by the beacon 108 may be used by the server 112 to determine the nearby entities, as discussed above.

Figure 2:
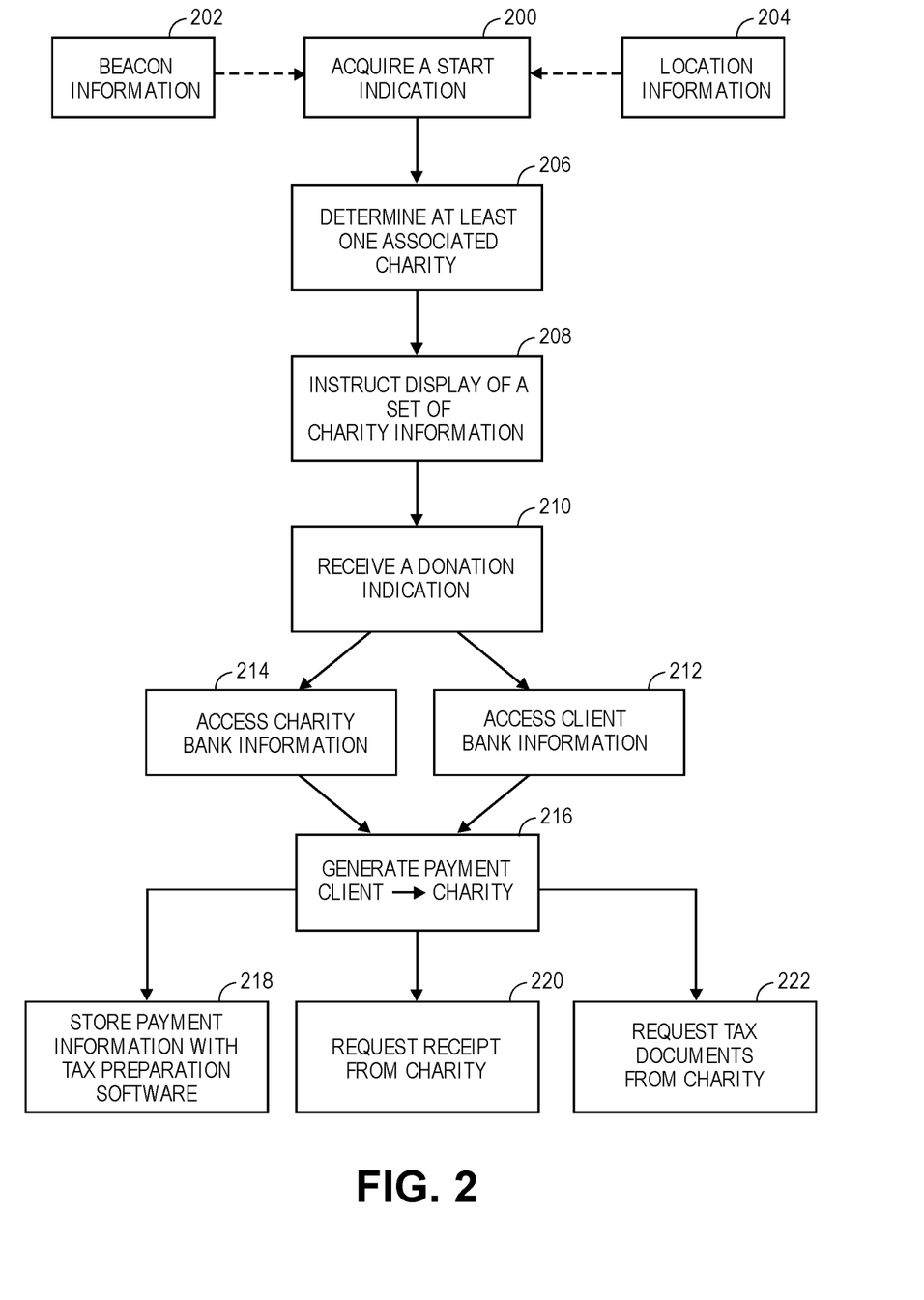
FIG. 2 is a method flow diagram illustrating various steps as performed by a server in some embodiments of the invention.

FIG. 2 illustrates exemplary steps performed by the server 112. The server 112 is communicatively coupled with at least one user device 106 and/or at least one beacon 108. In some embodiments, the server 112 is communicatively coupled with a set of beacons and a set of user devices. In some embodiments, the server 112 may be local to the entity location. In other embodiments, the server 112 is remote from the entity location and may be independent thereof. For example, the server 112 may be associated with the tax preparation system 120. In either embodiment, the various devices may communicate with the server 112 via various network architecture such as routers, hubs, switches, and the like.

In some embodiments of the invention in Step 200, the server 112 acquires a start indication. In some instances, such as Step 202, the start indication may include beacon identifier. In some instances, such as Step 204, the start indication may include location information for the user device 106. The start indication is associated with the user device 106 being in a location or in proximity to a location that a charitable donation is possible. In some embodiments, the start indication may be determined by the user device 106 and sent to the server 112. In other embodiments, the start indication is determined by the server 112 by monitoring the location of the user device 106. In other embodiments, there is no start indication, instead the steps discussed herein are performed as a background operation of the user device 106 or are performed remotely In some instances, the start indication is initiated via user input. The user 102 may select an option to make a donation before the above-discussed Step 202 and 204 are performed. The user 102 may select a button on an application to donate to a charity. The server 112 or the user device 106 will then determine the location of the user device 106 and/or whether there are any beacons in the vicinity (e.g., within communicable range of the user device 106). For example, if the user 102 is at a charity dinner event, the user 102 may select a button on the graphical user interface. The server 112 or the user device 106 will then determine where the user 102 is and see if there are any correlated charitable organizations to that location. In performing these steps, the server 112 and/or the user device 106 may access a database for the geographical area. The user device 106 may then present at least one possible charitable organizations for selection by the user 102 or allow the user 102 to search or specify a certain entity 104.

In some instances, the start indication is in response to a triggered condition that is associated with a rule set by the user 102. The user 102 may set a rule to provide a charitable donation upon certain conditions being met. The user device 106 and/or the server 112 may monitor the location and other aspects of the user device 106 to determine when and if the conditions are met. Upon determining that the conditions have been or are about to be met, the system 100 may determine a start indication and perform the below-discussed steps. For example, the user may set a rule to provide a charitable donation to a certain charity upon being within a certain geographical vicinity of the charitable organization for a certain length of time. Upon determining that these conditions are met, the start indication may initiate the steps to perform and track the charitable donation. As another example, the user may set a rule to perform a charitable donation upon a completion of a charity event, such as a fun run or other athletic event. The user device 106 may track the distance traversed by the user 102 and, upon successful completion of the athletic event, trigger a start indication to provide the charitable donation.

In Step 206, the server 112 determines at least one associated entity 104. The entity 104 that is determined may be based upon the beacon identifier, the location information, user input, or other information related to identifying at least one entity 104 associated with the location of the user device 106 and/or customer interest. The at least one entity 104 may be based upon a known fixed location of the entity 104 and/or a known temporary location of the entity 104 (such as a charitable event). The entity 104 may be identified by a name, a number, a system-specific identifier, a web address, charitable financial institution information, or other identification information.

In Step 208, the server 112 instructs the user device 106 to display a set of charitable information. The set of charitable information is associated with the entity 104. The set of charitable information may include information indicative of the philanthropic goal of the entity 104 (as discussed above), the name and location of the entity 104, the name and contact information for at least one person associated with the entity 104, specific projects or goals for which at least a portion of the charitable donation will be used, and other information so as at allow the user 102 to make an informed decision about whether to donate to the entity 104 and how much to donate. The set of charitable information may be displayed on the user device 106 as a notification, in an application associated with the system 100, in an electronic message, or in another form.

In Step 210, the server 112 receives a donation indication that the user 102 wants to donate to the entity 104. The donation indication may be indicated by user input associated with the set of charity information, by an independent communication from the user 102, or the like. The donation indication may include the name or other identifier of the entity 104, the amount of the donation, the currency to be used for the donation, a specific project or note indicating how the donation is to be utilized, a time and date for the donation to be made (which may include an indication to make the donation as soon as possible), a specific account from which the donation is to be sent, a purpose for the donation, or other information so as to assist the server 112, the entity 104, and/or the user 102 in submitting and tracking the charitable donation.

In Step 212, the server 112 accesses a set of client financial institution information from which the donation will be sent. The client financial institution information may be previously known to the system 100. For example, the client may provide financial institution information and provide access to the client financial institution funds while setting up an account on the system 100 (as discussed below). The client may also provide financial institution information during a previous tax return preparation process that was performed via the tax preparation system 120. The client financial institution information may include account numbers, authorization information, credit card information, debit card information, and other information that will allow the server 112 to instruct or request a transfer of funds out of the customer account.

In Step 214, the server 112 accesses a set of entity financial institution information to which the donation will be sent. The entity financial institution information may be previously known to the system 100. For example, the entity 104 may provide entity financial institution information while setting up an account on the system 100 (as discussed below). The entity financial institution information may also be associated with the beacon identifier (such that the beacon 108 projects at least a portion of the financial institution information) or be located in the entity database 114 shown in FIG. 1. The entity 104 may also have provided the entity financial institution information during an interaction with the tax preparation system 120 such as the filing of tax exempt documents (such as those discussed above) in achieving the tax exempt status. If the entity financial institution information is not available, the server may proceed with the discussed steps and determine the entity financial institution information after the conclusion of the other discussed steps. In some instances, if there is no ascertainable entity financial institution information, the system may generate a paper check to be mailed to the entity 104 or use another institution-independent payment method.

In Step 216, the server 112 generates a donation payment from the client to the entity 104. The donation payment may be in the form of a direct payment instruction, a request for payment, a direct charge to a credit or debit card, a generation of a check or other negotiable instrument, a generation of an automated clearing house (ACH) disbursement, or other type of payment initiation. The donation payment may include information related to the user financial institution 116, the entity financial institution 118, the amount of the payment, the date and time of the payment, and other needed information to facilitate the fund transfer.

In Step 218, the server 112 stores payment information with the tax preparation system 120. The stored payment information may then be utilized during the tax return preparation process by the tax preparation system 120, the user 102, or a tax professional. The stored payment information will remind the user 102 of the donation payment and provide other relevant details to claim the donation payment as part of the tax return preparation process, as discussed below. It should also be appreciated that the donation payment information for multiple donations given over a period of time may be so stored with the tax preparation system 120.

Additionally or alternatively, the server 112 may store the payment information locally or at the user device 106. The locally stored payment information may assist the user 102 in budgeting all charitable giving across many charitable organizations. If the user 102 performs all or substantially all charitable giving through embodiments of the invention, the user 102 may track the overall amount of charitable giving that has been done. The user 102 may utilize this information in order to achieve a total giving goal (either for tax reasons or philanthropic reasons) or to prevent exceeding a total giving goal (for users that give more than they can financially afford to do).

In Step 220, the server 112 may request, receive, or otherwise acquire a receipt from the entity 104. The receipt may include an indication that the donation payment has been received. The server 112 may then provide an indication to the user 102 that the donation payment has been completed and received by the entity 104. The receipt may additionally be stored in association with the tax preparation system 120. It should be appreciated that, like other steps discussed herein, this step may be performed substantially later than other steps. For example, if the system sends a paper check to the entity 104, the receipt may take days or weeks to be received. In some instances, the receipt may not be directly sent by the entity 104, but may be inferred from circumstances, such as by the depositing of the check. Embodiments of the invention may therefore operate without any prior relationship with the entity 104.

In Step 222, the server 112 may request, receive, or otherwise acquire tax documents from the entity 104 related to the donation. The tax documents may be in the form of a Form 1099, a completed Form 8283, a receipt document, or the like. For example, in the United States, the IRC requires a confirmation to claim a deduction in excess of $250. Examples of a confirmation include a financial institution record, a payroll deduction, or a written acknowledgement of the entity 104 showing the amount or description of the donation. The tax document provided by the entity 104 may meet these requirements. In some embodiments, the entity 104 may provide these documents to the server 112, to the tax preparation system 120, and/or to the user 102. It should also be appreciated that Step 222 will often be performed weeks or months after the above-discussed steps. This is because these tax documents are often generated and sent at the end of the taxing season, as discussed below.

In some embodiments, the system 100 may provide a single receipt for all donation payments made by the user 102 in the tax season to all charitable organizations. Because the system 100 has verified each of the charitable donations, the system 100 may provide a single, simplified receipt to the user 102 for tax preparation purposes. The single receipt may simplify the reporting and verification of deductible donations for the tax return.

Various embodiments and instances of the tax preparation system 120 will now be briefly discussed, so as to orient the reader on the tax preparation process. The "user" and/or the "client" is the person who is utilizing or interacting with the system 100, and specifically the user device 106. In the exemplary tax field, the user 102 acts, or purports to act, on behalf of the taxpayer whose tax return is going to be prepared. Examples of users include the taxpayer, an authorized friend or family member of the taxpayer, a tax professional, a financial professional, or other person. In some embodiments, the user 102 is connected to the system 100 while the discussed steps are performed. In other embodiments, the user 102 is no longer connected to the system 100 while the discussed steps are performed. It should also be appreciated that the user 102 that is interacting with the system 100 during the donation payment may be different than the user 102 that is interacting with the system 100 during the preparation of a tax return.

The user 102 may connect to the tax preparation system 120 by utilizing the user device 106, or another electronic device such as a smart phone, a tablet computer, a laptop computer, a smart watch, and other computing devices (as discussed below). The user device 106 may be provided by the tax professional or financial professional for temporary use by the client. The user device 106 may additionally or alternatively belong to the client, such as the personal smart phone that the client uses every day.

In embodiments of the invention, the tax preparation system 120 may have an associated tax professional. The tax professional includes any entity, either a legal person or natural person, or a computer program adapted to preparing taxes or providing other financial services. Examples of tax professionals include, but are not limited to, the following: a company, such as H&R Block, Inc.®, or an employee or agent of such a company; software adapted to prepare tax returns or other financial documents; and a person, legal or natural, who advises or assists the taxpayer in preparing their own tax return. The tax professional may also comprise a database for storing of tax related documents.

In other embodiments of the invention, the professional is a financial professional. A financial professional includes any entity, either a legal person or a natural person, or a computer program adapted to provide financial services or products. For example, the financial professional could be a financial advisor, accountant, attorney, etc. By way of another example, the financial professional could be a website for monitoring the taxpayer's financial assets and liabilities. The financial professional may utilize embodiments of the invention to assist customers in retaining documents generated or processed by the financial professional.

In the exemplary field of tax, the "professional services" may be the preparation of a tax return. The tax return is essentially a report filed with the appropriate government taxing authority, such as the IRS in the case of U.S. federal income tax. Typically, the tax return contains information used to calculate the tax due. Typically, the tax return is either printed or hand-written on a form generated by the taxing authority, such as the Form 1040. However, the tax return could be on another type of form, a financial document, or other document. On the tax return, the taxpayer or tax professional calculates the taxes due. To assist in the calculation and to allow the taxing authority to verify the calculations, the tax return contains pertinent information associated with the taxpayer for the tax period. The tax return can be either written, digital, or a combination of both. In other embodiments, information relevant to the taxpayer and the tax to be paid are provided on other various forms and documents.

Tax returns are typically due in a tax return filing season following the tax year. A tax year is typically a calendar or fiscal year upon which the tax is calculated. A tax period may be another length of upon which the tax is calculated, such as a month, a quarter, half of a year, two years, five years, etc. It should be appreciated that the "current tax year" and "current tax period" as used herein, refers to the tax year or tax period for which the tax return relates. For example, a tax return submitted in March 2016 typically relates to the 2015 tax year. This is because the taxes accrue ending December 31 of the tax year and the tax return is submitted at some point in the following calendar year as prescribed by law (e.g., by April $15^{th}$). During the tax year, various tax-related documents may be provided to the user 102. As the user 102 may not yet be legally allowed to file their tax return (because the user 102 is currently in the tax year, prior to the tax return filing season) the system 100 retains the information related to the charitable gift such that the information may be retrieved and analyzed during the tax return preparation process.

Various other exemplary fields will now be briefly discussed. It should be appreciated that these exemplary fields provide the reader with an understanding of potential ways in which the invention can be implemented. This disclosure is therefore not intended to be limiting, but instead provide easy-to-understand exemplary fields of embodiments of the invention.

Figure 3:
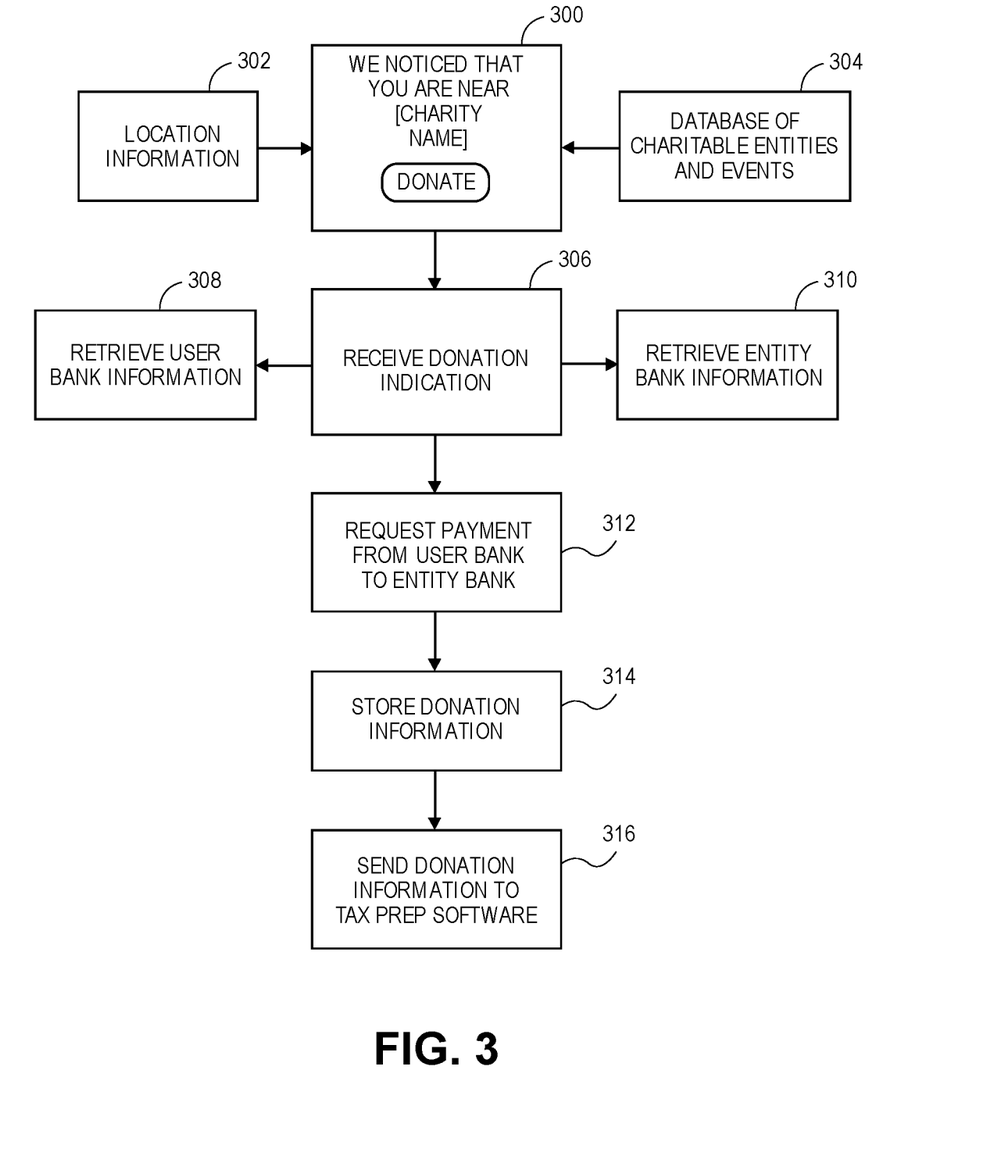
FIG. 3 is a method flow diagram illustrating various steps as performed by a user device in some embodiments of the invention.

Turning to FIG. 3, steps as performed by the user device 106 in some embodiments of the invention will now be discussed. FIG. 3 illustrates various steps that may be performed at least in part by the user device 106. As with other steps discussed herein, these steps may be performed in any order.

In Step 300, the user device 106 displays, via a graphical user interface on a display, a screen prompting a donation. The prompt screen may be displayed based at least in part upon a set of location information that is determined in Step 302. The location information may include beacon identifier and/or location information for the user device 106 in relation to a known location or boundary. The prompt screen may also include information about the entity 104. The information about the entity 104 may be determined from a database of charitable entities and/or charitable events in Step 304. The database may include static information about charitable organizations and associated locations. The database may additionally or alternatively include information about specific events and associated locations for various charitable functions.

In some embodiments, the user 102 may select to receive the prompt screen. The user 102 may activate an application associated with the system 100. The application may include a prompt screen in which the user 102 can select to make a donation. Based upon this user selection, the user device 106 may identify at least one entity 104 in the vicinity of the user device 106.

In some embodiments, the location information may be compared to a map of charitable organizations. For example, the user 102 may be at a location that has many charitable organizations in the vicinity. When the user 102 selects to make a donation, the user device 106 and/or the server 112 may access a map provided of the event by at least one entity 104 or municipality. Based upon the map, the user device 106 may determine one or more charitable organizations that are near the user's 102 current location.

In Step 306, the user device 106 receives a donation indication from the user 102. The donation indication may be via a selection of the prompt screen by the user 102 or via another indication from the user 102 that the user 102 desires to make the prompted donation. The donation indication may include a user-specified amount, a default amount, a prompted amount, a selection from the user 102 of one of a set of prompted amounts, or other indication of the amount. The donation indication may also include information indicative of the destination entity 104 and a designated project or sub-unit of the entity 104.

In Step 308, the user device 106 retrieves user financial institution information. The user financial institution information may be received by prompting the user 102 to input various financial institution information (such as an account number and routing number, a credit card number, a debit card number, an authorization form, or other information). The user financial institution information may additionally or alternatively be accessed from an application or database associated with the tax preparation process. For example, the user 102 may have previously entered user financial institution information and authorized the tax preparation system 120 to oversee donation payments in the future. The user device 106 may therefore access this information.

In Step 310, the user device 106 retrieves entity financial institution information for the entity financial institution 118 that is associated with the entity 104. The entity financial institution information may be retrieved from a charity registration database that was completed, at least in part, by the entity 104 during a registration process. It should be appreciated that in some embodiments or instances, there may be no known entity financial institution information. In these embodiments, the system 100 may generate a paper check to be sent to a known address of the entity 104, or the system 100 may query the entity 104 to retrieve the entity financial institution information. This may include determining an address for the entity 104, such as by accessing an electronic resource associated with the entity 104, accessing public records associated with the entity 104, or performing other steps to determine an address. As with other discussed steps, this step of querying the entity 104 and/or determining the address may be performed subsequently to other steps discussed.

In Step 312, the user device 106 requests or instructs a payment from the user financial institution 116 to the entity financial institution 118. As with the other discussed steps, this steps may be performed via the server 112 illustrated in FIG. 1. In Step 314, the user device 106 stores the donation information. The stored donation information may assist the user 102 in tracking the previous and current donations via the graphical user interface. The stored donation information may also allow the user 102 to establish rules, triggers, and thresholds regarding current or future donations. For example, the user 102 may establish a rule to automatically make a similar donation for each instance in which the user 102 is at the current location for longer than a stated period of time (such as ten minutes, to prevent the instance from triggering while the user 102 is driving by the location). For example, this will allow the user 102 to automatically perform donations upon the happening of certain events or circumstances. For example, the user 102 can set up an automatic donation payment to a church whenever the user 102 is at the church on a Sunday for more than ten minutes. This allows the automated donation to be performed with no or little additional customer action.

In Step 316, the user device 106 send the donation information to tax preparation software, that may be associated with the tax preparation system 120 or be local to the user device 106. The donation information may then be imported or accessed during the tax return preparation process discussed above.

It should also be appreciated that embodiments of the invention may provide secondary benefits to the system 100 or the tax preparation system 120 in hosting the transfer of charitable donations. In embodiments of the invention, there is no fee charged to the entity 104 or the user 102 for the use of the services described herein (other than applicable financial institution fees, credit card fees, and the like). These embodiments of the invention described herein may nonetheless be provided by or associated with the tax preparation system 120 for any of a few reasons. First, the system 100 may provide client retention benefits. The client may perform their tax preparation services with the associated tax preparation system 120 because the tax preparation system 120 has already received and stored their donation information, thus simplifying the tax return preparation process. Second, the system 100 provides intermittent contact with the customer. Typically, tax return preparation systems and tax professionals only interact with their clients during the tax return preparation season discussed above. Embodiments of the invention therefore increase this contact which can lead to increased loyalty from the customer. Third, the system 100 may invite new customers to use the tax preparation system 120. For example, a new customer may utilize embodiments of the invention to track charitable donations and then be incentivized to use an associated tax preparation system 120 to prepare a tax return so as to easily utilize the tracked charitable donations.

Figure 4:
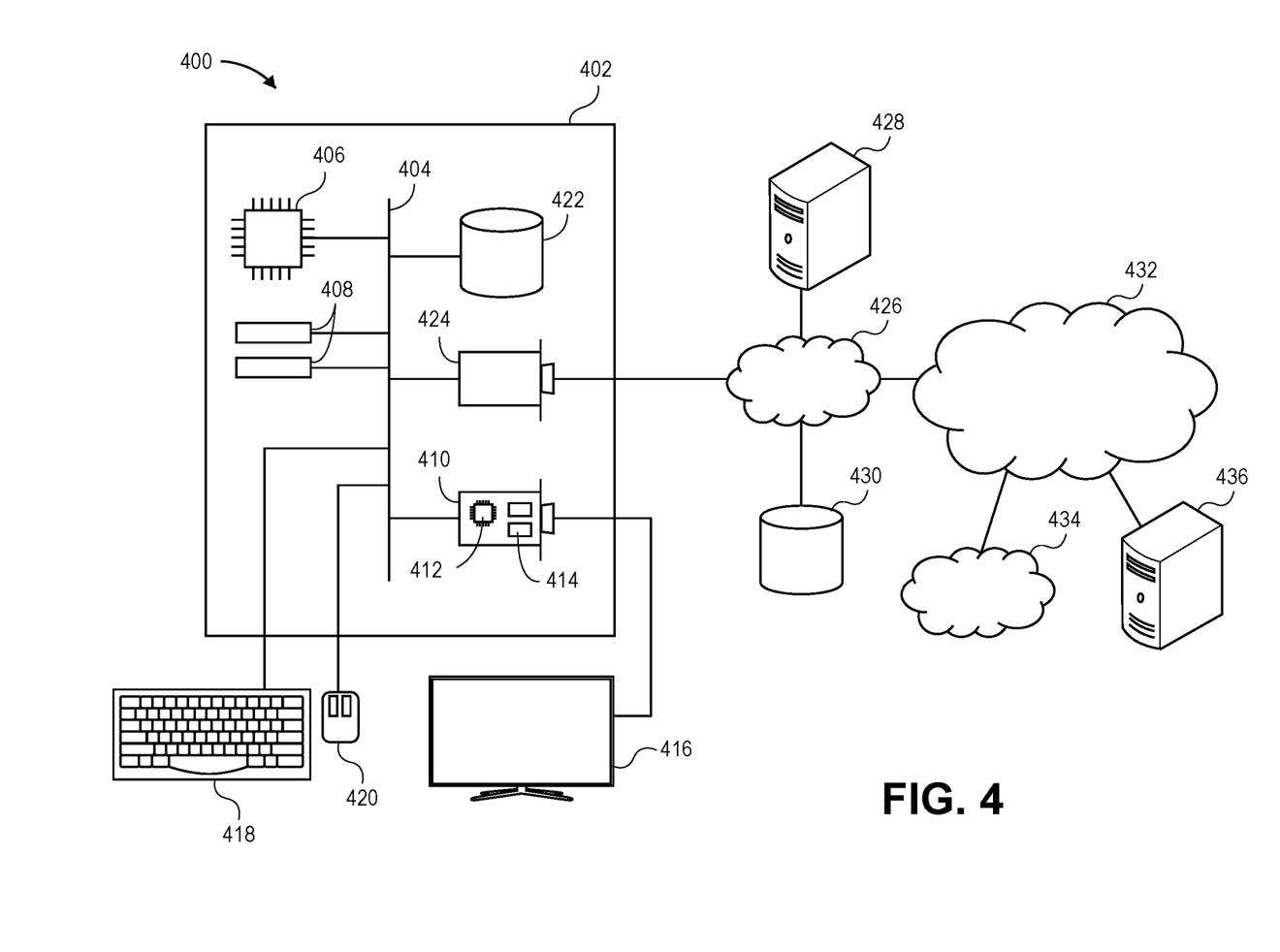
FIG. 4 is a system hardware diagram illustrating various hardware components of the system.

Turning to FIG. 4, the physical hardware that makes up the system will now be discussed. The system 400 comprising an exemplary hardware platform that can form one element of certain embodiments of the invention is depicted. Computer 402 can be a desktop computer, a laptop computer, a server computer, a mobile device such as a smartphone or tablet, or any other form factor of general- or special-purpose computing device. Depicted with computer 402 are several components, for illustrative purposes. In some embodiments, certain components may be arranged differently or absent. Additional components may also be present. Included in computer 402 is system bus 404, whereby other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408.

Also attached to system bus 404 is graphics card 410. In some embodiments, graphics card 410 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, and may be internally installed in computer 402 or externally and removably attached.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the IEEE 802.11 family of standards). NIC 424 connects computer 402 to local network 426, which may also include one or more other computers, such as computer 428, and network storage, such as data store 430. Local network 426 is in turn connected to Internet 432, which connects many networks such as local network 426, remote network 434 or directly attached computers such as computer 436. In some embodiments, computer 402 can itself be directly connected to Internet 432.

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), workstations, desktop computers, laptop computers, palmtop computers, tablet computers, portable digital assistants (PDA), smart phones, smart watches, wearable technology, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user 102 to interact with the electronic display by touching or pointing at display areas to provide information to the system 100.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

Embodiments of the invention directed to the computer program may perform any or all of the above-discussed steps. The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user computing device via the communication network. As used herein, the stand-alone computer program or web-accessible program provides users with access to an electronic resource from which the user 102 can interact with various embodiments of the invention.

In embodiments of the invention, users may be provided with different types of accounts. Some accounts may be previously existing, such as associated with a tax return preparation program. Each type of user account may provide their respective users with unique roles, capabilities, and permissions with respect to implementing embodiments of the invention. For instance, the user 102 may be provided with a user account that permits the user 102 to access embodiments of the invention that are applicable to identifying and donating to various charitable organizations, as well as tracking donation information and importing donation information into a tax return preparation program. The entity 104, or a person associated therewith may be provided with a user account that permits the entity 104 to access embodiments of the invention that are applicable to registering and advertising their entity 104, facilitating the transfer of funds, and helping track and report the receipt of funds. Additionally, the tax professional or financial professional may be provided with a tax/financial professional account that permits the tax professional or financial professional to access embodiments of the invention that are applicable to accessing donation records, verifying the donations, preparing the tax return, etc. In addition, any number and/or any specific types of account are provided to carry out the functions, features, and/or implementations of the invention. Upon the user 102, tax professional, and/or financial professional logging in to the electronic resource for a first time, they may be required to provide various pieces of identification information to create their respective accounts. Such identification information may include, for instance, personal name, business name, email address, phone number, or the like. Upon providing the identification information, the taxpayer, third party, and/or tax professional may be required to enter (or may be given) a username and password, which will be required to fully access the user 102 account.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for facilitating and tracking a non-obligated payment to allow a user to contribute to a philanthropic goal to help others, the system comprising:
   a beacon configured to provide a beacon identifier to a user device,
   wherein the beacon identifier provides an indication of a location of the beacon;
   a location-determining element associated with the user device that determines a location of the user device,
   wherein a distance traversed by the user is determined based on the location of the user device, and
   wherein an event progress is monitored based on the distance traversed by the user;
   a server configured to be communicatively coupled to the user device,
   wherein the server is configured to identify at least one entity based at least in part on the location indicated by the beacon identifier,
   wherein the server is configured to acquire a set of governing rules from the user including a plurality of trigger conditions,
   wherein the server is configured to automatically execute the non-obligated payment to the at least one entity based on the plurality of trigger conditions being met including a proximity of the user's device to the at least one entity; and
   a set of non-obligated payment information associated with the non-obligated payment,
   wherein the set of non-obligated payment information includes a non-obligated payment indication and at least one of: an indication of the at least one entity, an indication of the user, an amount of the non-obligated payment, a date of the non-obligated payment, and an indication of the user device,
   wherein the server, upon completion of the non-obligated payment, stores the set of non-obligated payment information,
   wherein the server, sends at least a portion of the set of non-obligated payment information to a tax preparation system to be used in a tax return preparation process,
   wherein the server is configured to allow the user to track non-obligated payments.

2. The system of claim 1,
   wherein the beacon is configured to be placed in proximity to an entity location,
   wherein the server is configured to access a database to identify the at least one entity.

3. The system of claim 1,
   wherein the server facilitates the non-obligated payment by interfacing with a user financial institution,
   wherein the server is configured to instruct the user financial institution to initiate the non-obligated payment,
   wherein the server is configured to provide entity financial institution information and amount information to the user financial institution.

4. The system of claim 1, wherein at least one of the plurality of trigger conditions is associated with an amount of time that the user is within proximity to the at least one entity and the non-obligated payment is executed based at least in part on said amount of time.

5. A computerized method for facilitating and tracking a non-obligated payment to allow a user to contribute to a philanthropic goal to help others, the method comprising:
   acquiring, from a location-determining element, a location indication of a user device;
   determining a distance traversed by the user based on the location indication of the user device;
   determining a completion of at least one portion of an event based on the distance traversed by the user;
   acquiring a set of governing rules including a plurality of trigger conditions from the user;
   determining at least one entity associated with the location indication of the user device;
   generating the non-obligated payment to the at least one entity;
   automatically executing the non-obligated payment based on the plurality of trigger conditions being met including a proximity of the user to the at least one entity and the completion of the at least one portion of the event;
   storing, upon completion of the non-obligated payment, a set of non-obligated payment information associated with the non-obligated payment,
   wherein the set of non-obligated payment information includes a non-obligated payment indication and at least one of an indication of the at least one entity, an indication of the user, an amount of the non-obligated payment, a date of the non-obligated payment, and an indication of the user device; and
   sending at least a portion of the set of non-obligated payment information to a tax preparation system to be used in a tax return preparation process,
   wherein a server is configured to be communicatively coupled to the user device to allow the user to track non-obligated payments.

6. The computerized method of claim 5,
   wherein the location-determining element is configured to be communicatively coupled with a beacon in proximity to the user device,
   wherein the beacon is configured to emit a beacon indication.

7. The computerized method of claim 6, wherein the step of determining the at least one entity is performed by comparing the beacon indication to a database to determine the at least one entity associated with the beacon indication.

8. The computerized method of claim 6, wherein the step of determining at least one entity associated with the location indication is performed by comparing the indicated location to a database to determine at least one entity associated with or in proximity to the location indication.

9. The computerized method of claim 8, wherein at least one entity is identified independent of whether at least one entity has opted into the database.

10. The computerized method of claim 5, further comprising the following steps:
    accessing a set of user financial institution information associated with the user from which the non-obligated payment is to be sent; and
    accessing a set of entity financial institution information associated with at least one entity to which the non-obligated payment is to be sent.

11. The method of claim 5, further comprising the following steps:
    receiving, from the user, a set of location requirements to determine at least one of the trigger conditions from the plurality of trigger conditions.

12. The computerized method of claim 5, further comprising:
    receiving an electronic message from the user device;
    generating a set of credentials based at least in part on the electronic message,
    wherein the set of credentials comprises information identifying a plurality of expected user devices; and
    restricting interaction such that only the expected user devices can be interacted with.

13. A non-transitory computer readable medium having a computer program thereon for facilitating and tracking a non-obligated payment to allow a user to contribute to a philanthropic goal to help others, wherein the computer program is configured to instruct at least one processor to perform the following steps:
    determining a location of a user device using a location-determining element associated with the user device;
    determining the at least one entity is associated with the location of the user device based on the entity location;
    determining a distance traversed by the user based on the location of the user device;
    determining a completion of at least one portion of an event based on the distance traversed by the user;
    acquiring a set of governing rules including a plurality of trigger conditions from the user;
    generating a non-obligated payment to the at least one entity;
    automatically executing the non-obligated payment based on the plurality of trigger conditions being met including a proximity of the user to at least one entity and the completion of the at least one portion of the event;
    storing, upon completion of the non-obligated payment, a set of non-obligated payment information associated with the non-obligated payment,
    wherein the set of non-obligated payment information includes a non-obligated payment indication and at least one of: an indication of the at least one entity, an indication of the user, an amount of the non-obligated payment, a date of the non-obligated payment, and an indication of the user device; and
    sending at least a portion of the set of non-obligated payment information to a tax preparation system to be used in a tax return preparation process,
    wherein a server is configured to be communicatively coupled to the user device to allow the user to track non-obligated payments.

14. The non-transitory computer readable medium of claim 13,
    wherein the location of a user device is received at least in part from a beacon in proximity to the user device,
    wherein the beacon is configured to emit a beacon indication.

15. The non-transitory computer readable medium of claim 14, wherein the step of determining the entity is performed by comparing the beacon indication to a database to determine the entity associated with the beacon indication.

16. The non-transitory computer readable medium of claim 13, wherein the step of determining the at least one entity associated with the location of a user device is performed by comparing the location of a user device to a database to determine the at least one entity associated with or in proximity to the location.

17. The non-transitory computer readable medium of claim 16, wherein at least one entity is identified independent of whether at least one entity has opted into the database.

18. The non-transitory computer readable medium of claim 13, further comprising the following steps:
    accessing a set of user financial institution information associated with the user from which the non-obligated payment is to be sent; and
    accessing a set of entity financial institution information associated with the at least one entity to which the non-obligated payment is to be sent.

19. The non-transitory computer readable medium of claim 13, further comprising the following steps:
    receiving, from the user, a set of location requirements to determine at least one of the trigger conditions from the plurality of trigger conditions.

* * * * *